United States Patent
Benedict et al.

(10) Patent No.: US 9,135,479 B2
(45) Date of Patent: Sep. 15, 2015

(54) ANTENNA ASSEMBLY FOR A TAG READER

(75) Inventors: Robert Leon Benedict, Tallmadge, OH (US); Joseph Carmine Lettieri, Hudson, OH (US); John Michael Fenkanyn, Akron, OH (US); Mario Vincent Orosa, North Canton, OH (US); Richard Nicholas Crano, Akron, OH (US); Joseph Paul Batcho, Sr., Warren, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 1324 days.

(21) Appl. No.: 12/640,024

(22) Filed: Dec. 17, 2009

(65) Prior Publication Data

US 2011/0148592 A1    Jun. 23, 2011

(51) Int. Cl.
  *G08B 5/22* (2006.01)
  *G06K 7/10* (2006.01)

(52) U.S. Cl.
  CPC ........ *G06K 7/10089* (2013.01); *G06K 7/10316* (2013.01); *H04Q 2213/13095* (2013.01)

(58) Field of Classification Search
  USPC ......... 340/933, 934, 935, 936, 938, 939, 940, 340/941, 942, 943, 572.7, 572.8, 7.63, 340/12.22, 10.3; 701/29, 30, 31, 33, 34; 378/61; 73/146, 146.2, 146.3, 146.4, 73/146.5, 146.8
  See application file for complete search history.

(56) References Cited

U.S. PATENT DOCUMENTS

| | | | |
|---|---|---|---|
| 1,849,730 A * | 3/1932 | Morse | 73/146 |
| 3,087,159 A * | 4/1963 | Gozinsky | 343/848 |
| 3,871,106 A * | 3/1975 | Hegenbart | 33/203.13 |
| 3,918,816 A * | 11/1975 | Foster et al. | 356/602 |
| 4,067,235 A * | 1/1978 | Markland et al. | 73/146.5 |
| 4,112,630 A * | 9/1978 | Brown, Jr. | 451/28 |
| 4,630,470 A * | 12/1986 | Brooke et al. | 73/146.2 |
| 5,396,817 A * | 3/1995 | Rosensweig | 73/146.2 |
| 5,445,020 A * | 8/1995 | Rosensweig | 73/146.2 |
| 5,569,848 A | 10/1996 | Sharp | 73/146.2 |
| 5,637,926 A * | 6/1997 | Zedonis | 307/10.1 |
| 5,671,158 A * | 9/1997 | Fournier et al. | 701/29.6 |

(Continued)

FOREIGN PATENT DOCUMENTS

| | | | |
|---|---|---|---|
| DE | 2610621 | 9/1977 | G01L 9/10 |
| EP | 924115 | 6/1999 | B60C 23/00 |

(Continued)

OTHER PUBLICATIONS

European Search Report completed Apr. 7, 2011.

*Primary Examiner* — George Bugg
*Assistant Examiner* — Paul Obiniyi
(74) *Attorney, Agent, or Firm* — Richard B. O'Planick

(57) ABSTRACT

An antenna assembly includes a stand having a convex outer surface positioned to intercept and engage a vehicle tire as the vehicle tire passes over the convex stand surface. The height and contour of the convex stand surface slows the rotational rate of the vehicle tire, and thereby a transmitting device carried by the tire, to a preferred rotational read rate as the vehicle tire passes over the convex surface. One or more antenna members mount to the stand proximal to the convex surface, each antenna having a directionally aimed tilted antenna field positioned to continuously receive data transmission from the electronic transmitting device as the vehicle tire passes over the convex stand surface at the reduced rotational read rate.

20 Claims, 8 Drawing Sheets

(56) References Cited

U.S. PATENT DOCUMENTS

| | | | |
|---|---|---|---|
| 5,682,142 A | 10/1997 | Loosmore et al. | 340/572 |
| 5,749,984 A * | 5/1998 | Frey et al. | 152/415 |
| 5,942,681 A * | 8/1999 | Vollenweider et al. | 73/146.2 |
| 6,246,226 B1 * | 6/2001 | Kawase et al. | 324/166 |
| 6,343,506 B1 * | 2/2002 | Jones et al. | 73/146.2 |
| 6,459,764 B1 * | 10/2002 | Chalmers et al. | 378/88 |
| 6,463,798 B2 | 10/2002 | Niekerk et al. | 73/146.2 |
| 6,546,635 B1 * | 4/2003 | Gerdes | 33/203.13 |
| 6,823,728 B1 | 11/2004 | Barnes | 73/146 |
| 6,885,291 B1 * | 4/2005 | Pollack et al. | 340/445 |
| 7,124,058 B2 | 10/2006 | Namaky et al. | 702/183 |
| 7,171,848 B2 * | 2/2007 | Giustino et al. | 73/146 |
| 7,222,522 B2 * | 5/2007 | Monguzzi et al. | 73/146 |
| 7,272,536 B2 * | 9/2007 | Potts | 702/185 |
| 7,295,103 B2 * | 11/2007 | Muller et al. | 340/443 |
| 7,301,445 B2 | 11/2007 | Moughler | 340/442 |
| 7,454,966 B2 * | 11/2008 | Fujioka et al. | 73/146.5 |
| 7,679,501 B2 * | 3/2010 | Dixon et al. | 340/447 |
| 7,817,023 B2 * | 10/2010 | Shimura | 340/442 |
| 2003/0006895 A1 * | 1/2003 | Drake et al. | 340/445 |
| 2003/0061719 A1 * | 4/2003 | Gerdes | 33/203.13 |
| 2003/0164758 A1 * | 9/2003 | King et al. | 340/442 |
| 2003/0197603 A1 * | 10/2003 | Stewart et al. | 340/442 |
| 2004/0090322 A1 * | 5/2004 | Tsujita | 340/442 |
| 2004/0201531 A1 * | 10/2004 | Fujimura et al. | 343/725 |
| 2005/0093687 A1 * | 5/2005 | Katou | 340/445 |
| 2005/0110627 A1 * | 5/2005 | Sabet et al. | 340/447 |
| 2005/0122257 A1 * | 6/2005 | Rowe et al. | 342/179 |
| 2005/0122258 A1 * | 6/2005 | Blasing et al. | 342/179 |
| 2006/0145828 A1 * | 7/2006 | Muller et al. | 340/442 |
| 2006/0273865 A1 * | 12/2006 | Timofeev et al. | 333/161 |
| 2007/0018805 A1 * | 1/2007 | Dixon et al. | 340/447 |
| 2007/0279203 A1 | 12/2007 | Thomas et al. | 340/447 |
| 2008/0167772 A1 * | 7/2008 | Du et al. | 701/33 |
| 2008/0180336 A1 * | 7/2008 | Bauregger | 343/753 |
| 2010/0160489 A1 * | 6/2010 | Hotaka et al. | 523/150 |
| 2011/0148726 A1 * | 6/2011 | Chang et al. | 343/770 |

FOREIGN PATENT DOCUMENTS

| | | | | |
|---|---|---|---|---|
| JP | 10302187 | | 11/1998 | B60C 23/02 |
| JP | 2002211219 | | 7/2002 | B60C 23/04 |
| WO | 2005/036694 | | 4/2005 | |
| WO | 2005072993 | | 8/2005 | B60C 23/04 |

* cited by examiner

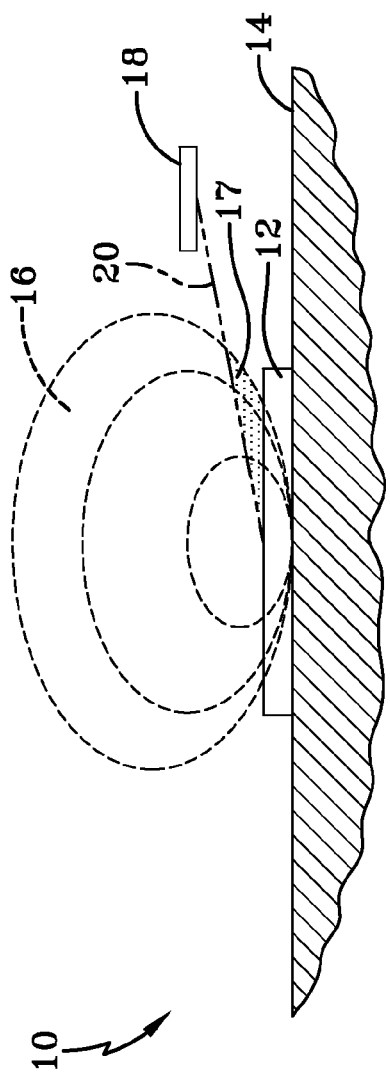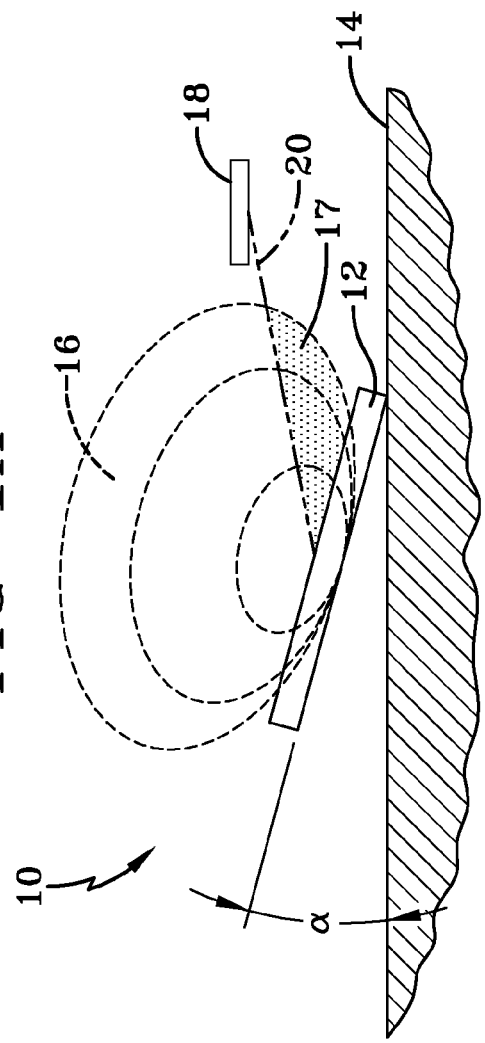

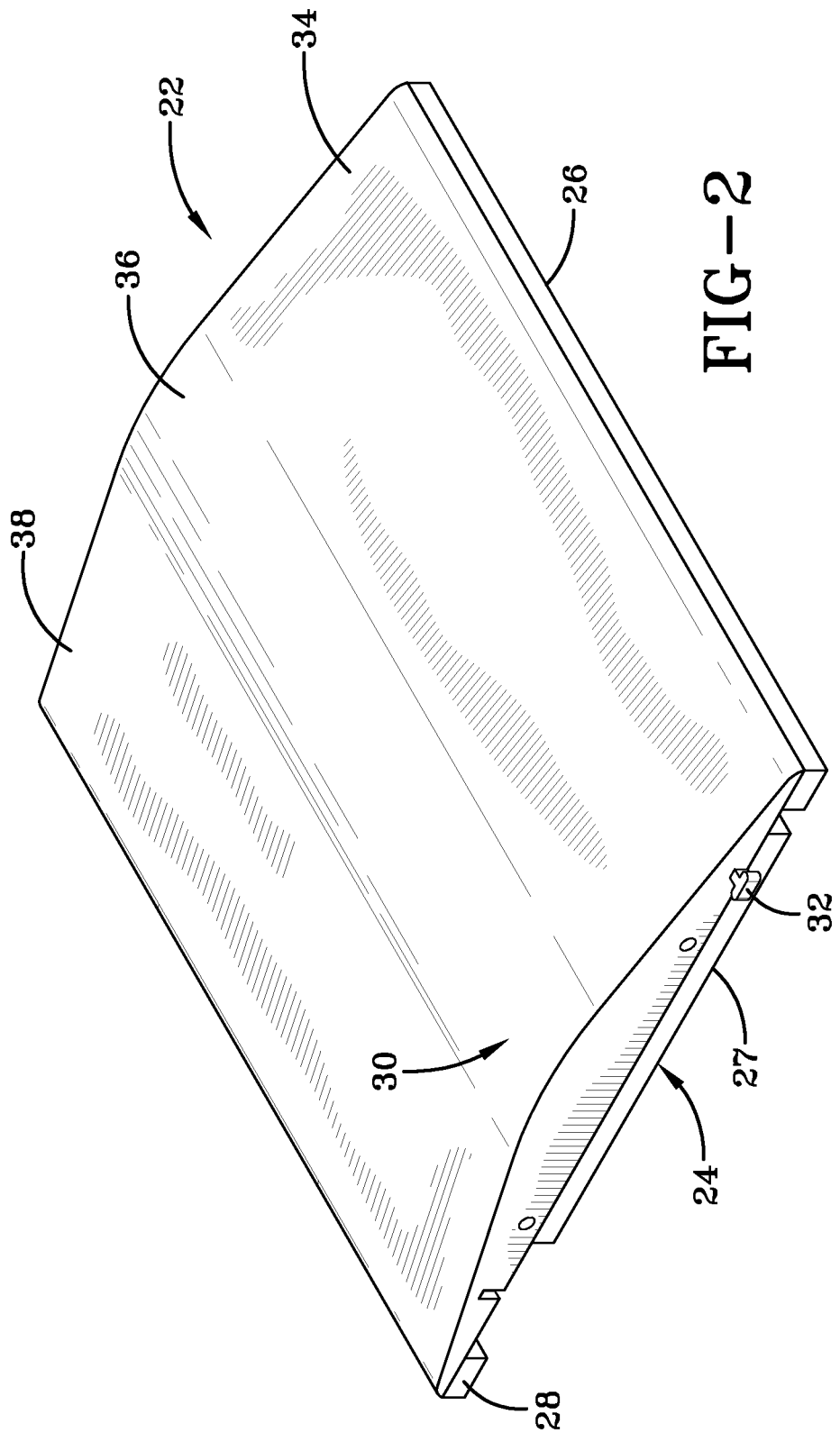

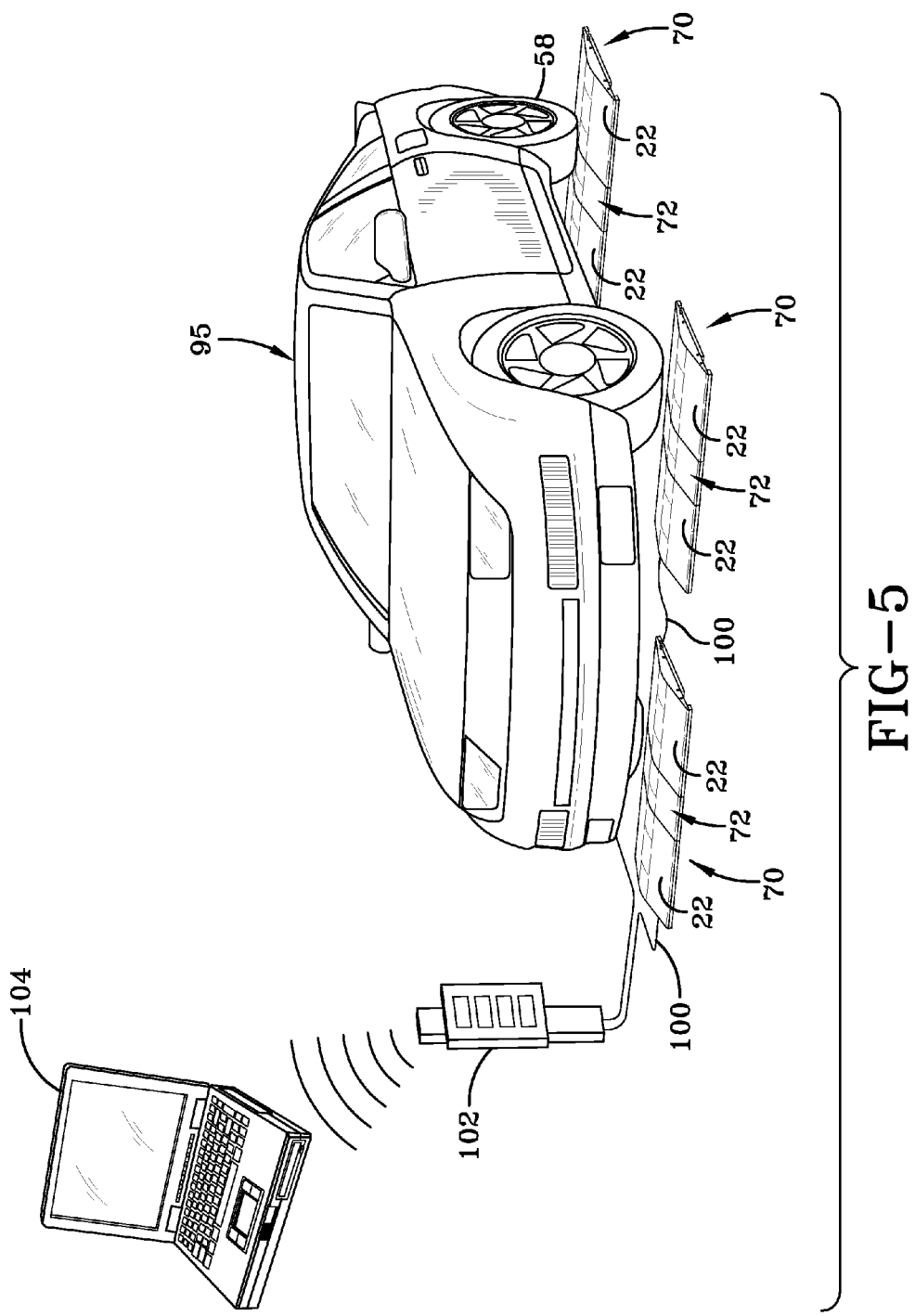

ANTENNA ASSEMBLY FOR A TAG READER

FIELD OF THE INVENTION

The invention relates generally to RFID device readers and, more specifically, to an antenna assembly for a reader of RFID devices mounted to the wheel units of a vehicle.

BACKGROUND OF THE INVENTION

Radio frequency identification devices (RFID devices) are useful in association with sundry product categories and have gained widespread commercial importance and acceptance. Such devices generally have memory storage capability for electronically storing product-specific information such as product history and a product identification number. The device further provides an integrated transmitter that transmits responsive to a prompt signal the stored data for receipt by a receiver antenna. For example, it is known to associate an RFID with a vehicle tire or wheel rim assembly in order to access tire, vehicle, and/or wheel related identification and history throughout the lifetime service of the product.

It is important in any RFID transmission system that the data transmitted by the product-based RFID device be transmitted reliably, expeditiously, and without error to a reader for processing and use. Without a reliable data transmission and reception capability, the integrity of the information downloaded and the utility of the system will be compromised. In a vehicle tire or wheel-based application, the construction of a reliable RFID data transmission system presents numerous application-specific challenges that must be addressed in order to achieve an acceptable level of performance.

SUMMARY OF THE INVENTION

According to an aspect of the invention an antenna assembly receives a data transmission from an electronic transmitting device mounted to a tire mounted vehicle. The antenna assembly includes a stand having an upper convex surface positioned to intercept and engage a vehicle tire as the vehicle tire passes over the elevated surface. The height and contour of the convex surface slows the rotational rate of the vehicle tire, and the transmitting device mounted to the tire, to a preferred rotational read rate as the vehicle tire passes over the convex surface. One or more antenna members mount to the stand below the convex surface, each antenna having a directionally aimed antenna field for coupled receipt of a data transmission from the electronic transmitting device as the vehicle tire passes over the convex stand surface at the reduced rotational read rate. The transmitting device is mounted to the vehicle tire and rotates with the tire and movement of the tire over the elevated surface at the reduced rotational read rate serves to prolong a coupling between the transmitting device and the one or more antenna fields. The span of the convex stand upper surface is sufficient to require at least one revolution by the tire and the transmitting device for the tire to pass over the convex surface at the reduced rotational read rate.

In another aspect of the invention the directionally aimed antenna is tilted at an acute tilt angle toward an approach path of the vehicle tire to the stand elevated surface. The convex surface of the stand may include a leading inclined surface portion tilted in the same direction as the antenna.

A directionally aimed second antenna may be mounted to the stand in another aspect of the invention, the second antenna creating a directionally aimed second antenna field operative to receive data transmission from the electronic transmitting device as the vehicle tire passes over a trailing portion of the convex stand surface at the reduced rotational rate. The first and the second antenna may be positioned on opposite sides of the stand at oppositely directed tilt angles.

In a further aspect, the antenna assembly may include an extension member positioned adjacent to the stand and including an upper convex extension surface of complementary concavity with the stand upper convex surface. The antenna is thereby positioned to the side of the tire and the transmitting device as the vehicle tire passes over the extension member upper surface for improved transmission coupling.

BRIEF DESCRIPTION OF THE DRAWINGS

The invention will be described by way of example and with reference to the accompanying drawings in which:

FIG. 1A is a schematic representation of an antenna and the field generated therefrom with a transmitting device approaching the antenna;

FIG. 1B is a schematic representation of the antenna of FIG. 1A tilted toward the approaching transmitting device.

FIG. 2 is a top perspective view of an antenna assembly configured pursuant to the invention.

FIG. 5 is a schematic representation of a read station in which four antenna assemblies are positioned to intercept four vehicle tires and transmit downloaded data from the transmitting devices in the tires to a remote data processing computer.

DETAILED DESCRIPTION OF THE INVENTION

Figure 3:
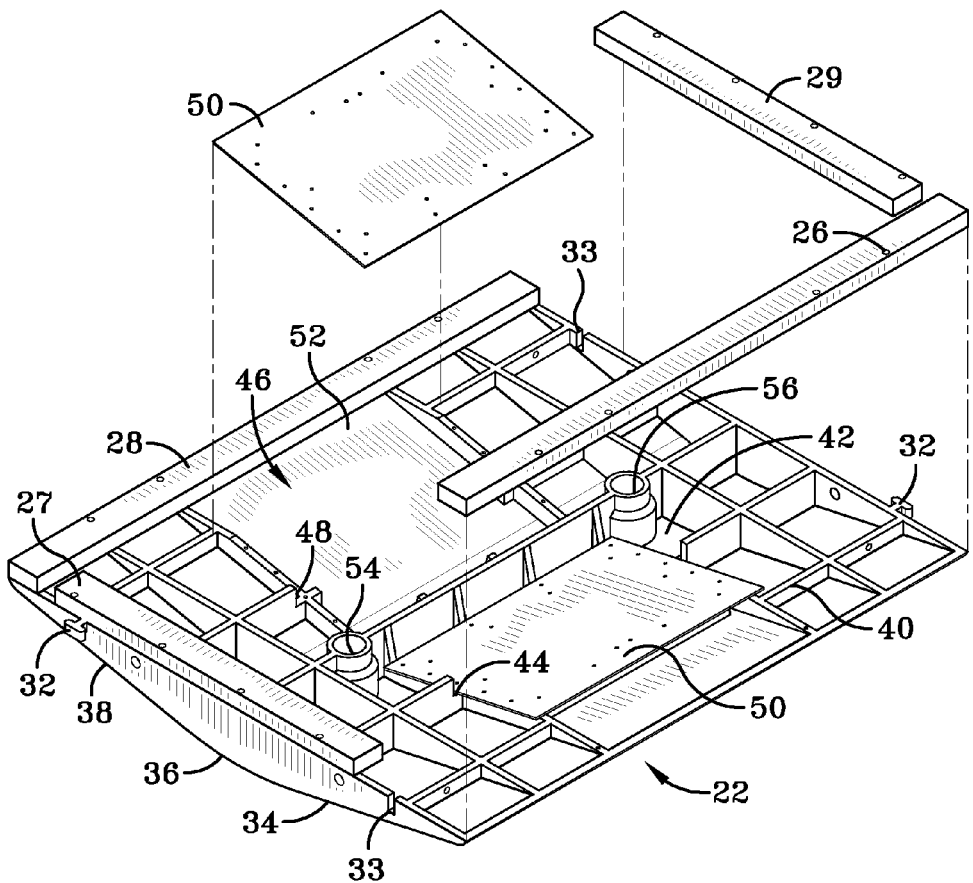
FIG. 3 is an exploded bottom perspective view of the antenna assembly of FIG. 2.

Referring to FIGS. 1A and 1B, a schematic of an antenna system 10 is shown including an antenna 12 positioned flat on a ground surface 14. The antenna 12 generates a field or beam pattern 16 for the purpose of receiving data transmission signals 20 from an approaching electronic device 18. Device 18 is of a type commercially available and used, such as a radio frequency identification (RFID) tag. The tag 18 may be mounted to a product that moves toward and away from a read station in which the antenna 12 and its generated beam pattern 16 is situated. The speed at which the tag 18 approaches and leaves the vicinity of the antenna 12 will affect the time interval in which the transmitted data 20 is received by the antenna field 16. The read range of the antenna 12 is increased and represented by the shaded region 17 of the field 16. A maximized read range will positively affect the coupling efficiency between the transmitted signal 20 and the antenna field 16 and serve to promote a complete and accurate data transmission as the tag approaches and leaves the vicinity of the antenna 12.

FIG. 1B shows an alternative antenna position within a read station in which the antenna 12 is tilted toward the approach path of the tag 18. Tilting of the antenna 12 at an acute angle α with respect to the ground surface 14 will cause the beam pattern 16 to tilt at angle α toward the approach path (represented by data transmission 20) of the tag 18. The tilting of the field 16 toward the approach path of the tag 18 serves to enlarge the read field 17 as shown by the larger shaded region of FIG. 1B as compared with the shaded region of FIG. 1A. The read range of the antenna 12 is thus maximized by introducing a mechanical tilt at angle α. The enlargement of the read range 17 effected by mechanically tilting the antenna 12 improves the reliability of the system and ensures that transmitted data will be captured as the tag 18 moves through the read zone. With the mechanical tilt, more of the cross-sectional area of the antenna pattern 16 is available and improved transmission efficiency is gained.

With reference to FIGS. 2 and 3, a tilted antenna system stand 22 is shown to include a stand freestanding base 24 supported by elongate support legs 26, 27, 28, and 29. The support legs affix to an underside of the base 24 along outer peripheral locations and for support of the base on a ground surface. The stand 22 is provided with a cover 30 having a convex profile that covers the top of the base 24. As used herein, "convex" is meant in a general sense. The cover upper convex surface may be composed of adjoining flat surface segments or be continuously radiussed as shown. The base is formed of any suitably strong material such as plastic, and is configured having a protruding latch finger 32 and latch slot 33 spaced apart along each side of the stand. The finger 32 is shaped to interlock with the slot 33 of a like-configured unit to thereby chain multiple stands together in a series. The stand cover 30 is of convex sectional configuration, formed to include a forward inclined surface 34 extending to an apex or crown 36, and a rearward inclined surface 38 extending from the crown 36 to a rearward side of the stand. A matrix of cross-ribs 40 may be molded into the underside of the base 24 for adding strength to the structure.

The cross-ribs 40 define a forward antenna receiving recess 42 with support notches 44 formed in ribs along the sides of the recess 42. A similarly configured rearward antenna receiving recess 46 is positioned between the cross-ribs 40 of the rearward portion of the base, likewise providing support notches 48 formed in ribs along the sides of the rearward recess 46. A forward antenna 50 is sized to fit within the forward recess 42, resting upon notches 44. A rearward antenna 52 is positioned within rearward recess 46 and rests upon the notches 48. The notches 44, 48 formed within the cross-ribs 40 form an angled seat within the recesses 42, 46 such that the antennae 50, 52 when positioned within the recesses are at an acute angle with respect to a vertical centerline of the stand 22. The antennae 50, 52 angle in opposite directions from the centerline at an acute angle α (see FIG. 1B) which is preferably between 13 to 15 degrees, although angles of different magnitudes may be used respectively for the two antenna in order to create the antenna field desired.

It will be appreciated that the cover 30 is formed of RF transparent material and serves to enclose the antennae 50, 52 in their angled position within the stand. Assembly posts 54, 56 mate within sockets formed in the cover to attach the cover to the ground surface 14 in FIGS. 1A and 1B. The antennae 50, 52 are angled within the base 24 at the aforementioned acute angle which may be the same for each antenna or different, depending on the system objectives and requirements. In the assembled condition, the antennae 50, 52 generally reside beneath the inclined RF transparent surfaces 34, 36, respectively. The angle of inclination of the antennae 50, 52 and the surface portions 34, 36 may be the same or differ. The stand assembly 22, it will be appreciated, produces a speed bump when the stand is positioned to intercept the wheels of an oncoming vehicle. The tires of the vehicle are intended to ride up the forward surface 34, over the crest or apex 38, and down the rearward inclined surface 38. The slopes of inclined surfaces 34, 38 are designed to create a bump of desired severity so that a vehicle traveling over the stand 22 will be slowed to an objective read speed. Thus, the slope of the inclined surfaces 34, 36 may be more or less than the slope of the inclined antennae 50, 52 within the stand, depending on the degree of bump necessary to slow the oncoming vehicle to an objective read speed.

Figure 4A:
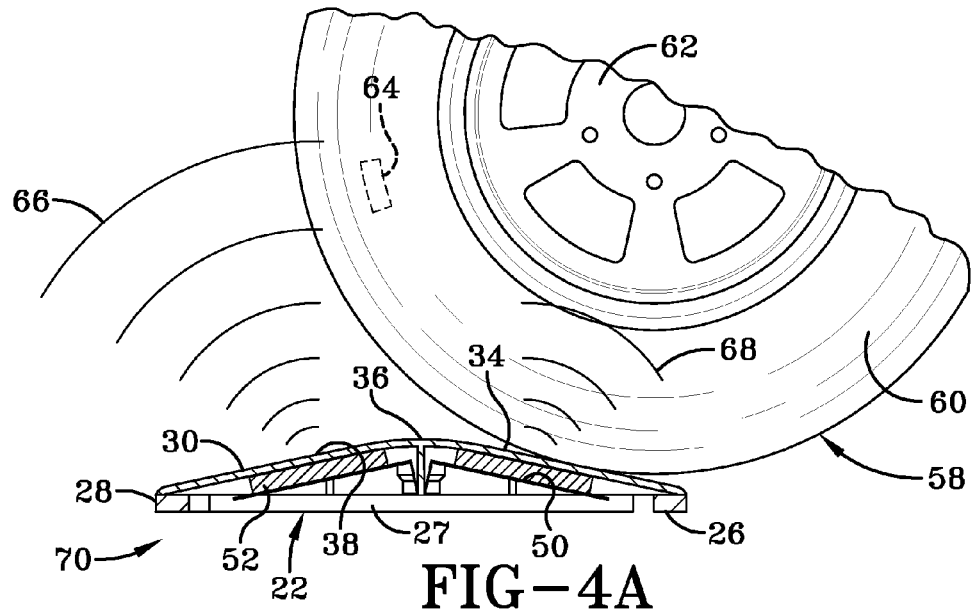
FIG. 4A is a schematic representation of a vehicle tire initial travel over the antenna assembly.
Figure 4B:
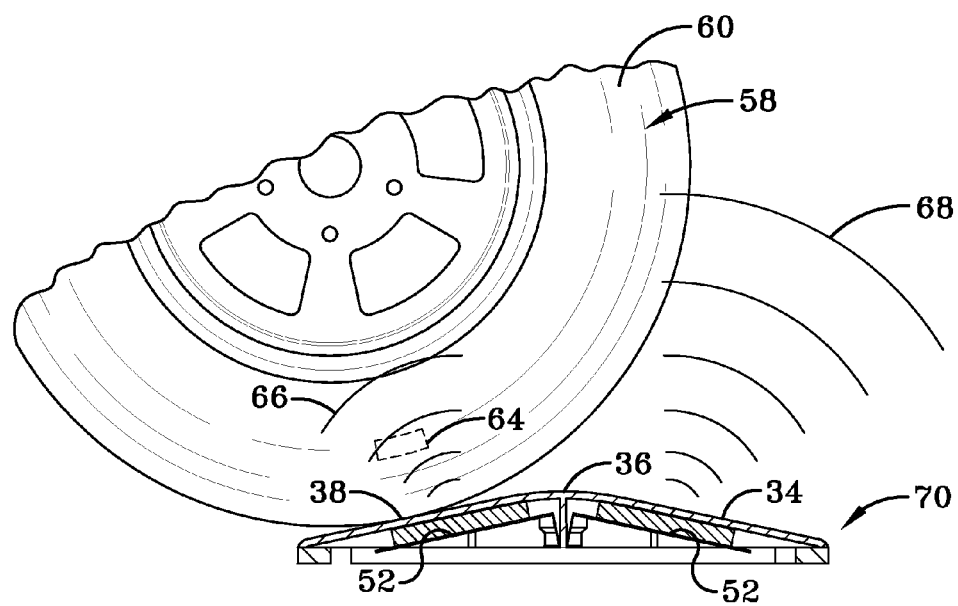
FIG. 4B is a schematic representation of a the vehicle tire traveling over a rearward surface portion of the antenna assembly.

FIGS. 4A and 4B illustrate the operation of the speed bump created by the stand 22 and the tilted antenna 50, 52 positioned within the stand as a vehicle tire 58 rides up, over, and down the stand surfaces 34, 36, 38. The tire 58 includes a sidewall 60 and mounts to a rim 62 in standard fashion. An RFID tag 64 is secured to the tire 58 by conventional means at a conventional location such as to the tire inner liner (not shown) defining the tire cavity. So positioned, the tag 64 rotates with the tire 58 at the same speed of rotation. An antenna beam pattern 68 from the forward antenna 50 is tilted toward the tire 58 approach path as the tire engages and rolls up the inclined surface 34 of the stand 22. The tilt of the antenna 50 within the stand 22 tilts the field 66 so as to allow the signal from the tag 64 access to more of the field cross-section as tag 64 rotates with the tire. The second, rearwardly mounted antenna 52 is likewise tilted within the stand in the opposite (rearward facing) direction from the forward (forward facing) tilted antenna 50. The field or beam pattern 66 is thus tilted to the rear by the generally same angle α as the forward beam pattern 68 from antenna 50 tilts forward. It is preferred, although not necessary, that the acute tilt angle α be within the range of 13 to 15 degrees.

Figure 9:
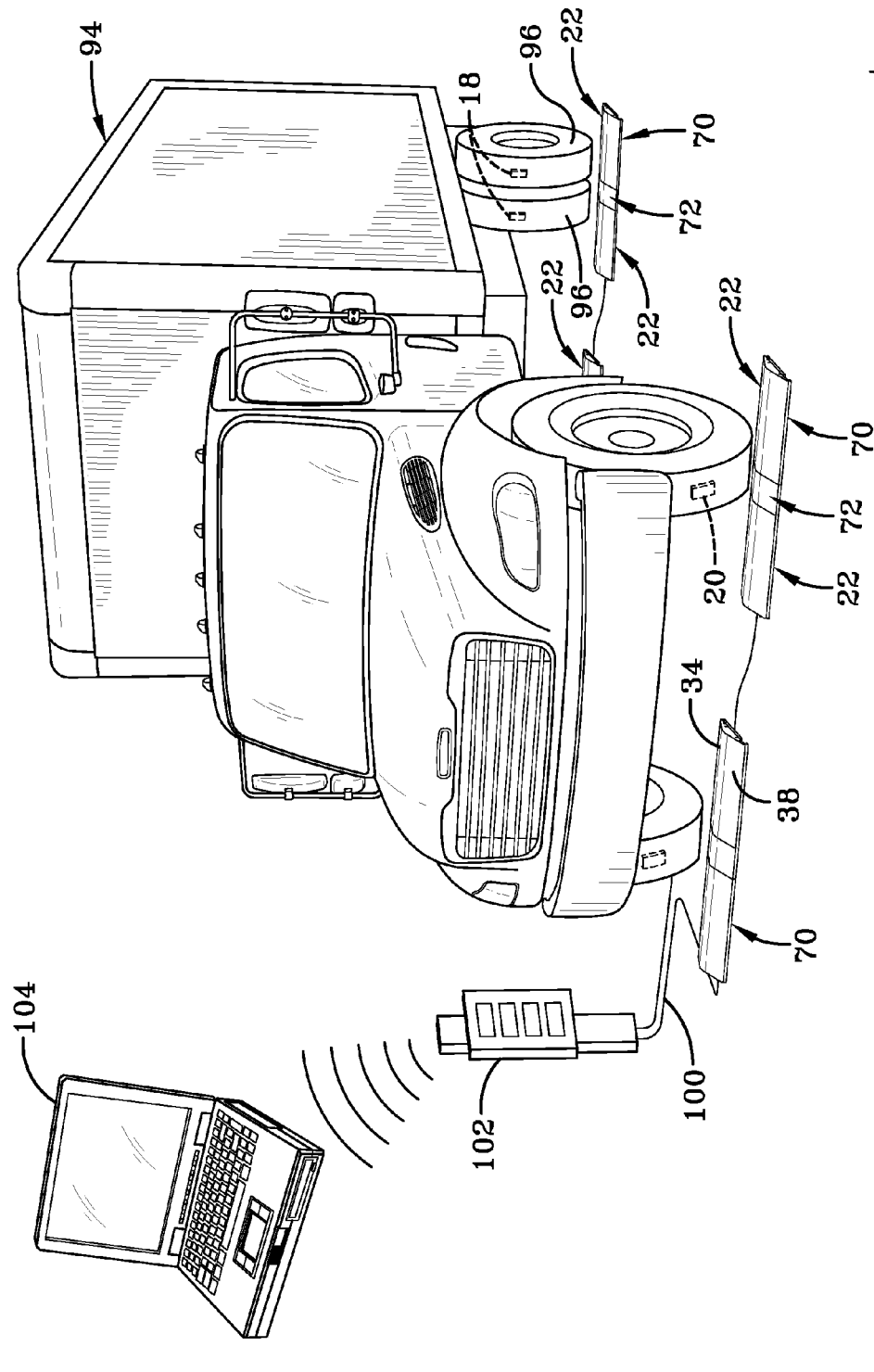
FIG. 9 is a schematic representation of a read station in which four three-component antenna assemblies are positioned to intercept truck tires and transmit downloaded data from the transmitting devices in the tires to a remote data processing computer.

The position of the antenna 50 relative to the antenna 52 is close enough such that the beam patterns 66, 68 overlap to a minimal extent and cover without a gap the area above the stand 22. Thus, the tag 64, mounted to the tire 58, will rotate over the surfaces 34, 36, 38 with the tire and complete a revolution with the tire 58 within the time interval required for the tire to move over a stand and/or multiple antenna component assemblies 70 as shown in FIGS. 5 and 9. As the tag rotates, data transmission by the tag will intersect the beam patterns 66, 68 of one or both of the antenna 50, 52. A reliable and complete transmission of data is thereby assured.

Moreover, the speed at which the tag 64 rotates with the tire 58 may be controlled by controlling the front to rear span and/or degree and/or extent of incline of the speed bump represented by surfaces 34, 36, and 38 of the stand 22. A higher angle of tilt of the forward and rearward surface or lengthening the surfaces 34, 36, and/or 38 raises the "bump" and will generally obligate the driver of the vehicle to slow down to a greater extent. This, in turn, slows the rotational speed of the tire and tag 64 over the stand 22 and elongates the time period (read interval) during which the tag transmission may be communicated to the antenna patterns 66, 68. Conversely, lowering the "bump" by adjusting the angle of tilt and/or width of stand surfaces 34, 36, and 38 will obligate a driver to slow the vehicle to a lesser extent. The read interval between the tag 64 and the beam patterns 66, 68 will be reduced accordingly. By adjusting the size (span) and/or tilt of the stand surfaces with the tilt of the antenna beam patterns, an optimal read interval may be attained that is long enough to effect a highly reliable data transmission without slowing the vehicle unnecessarily.

Figure 6:
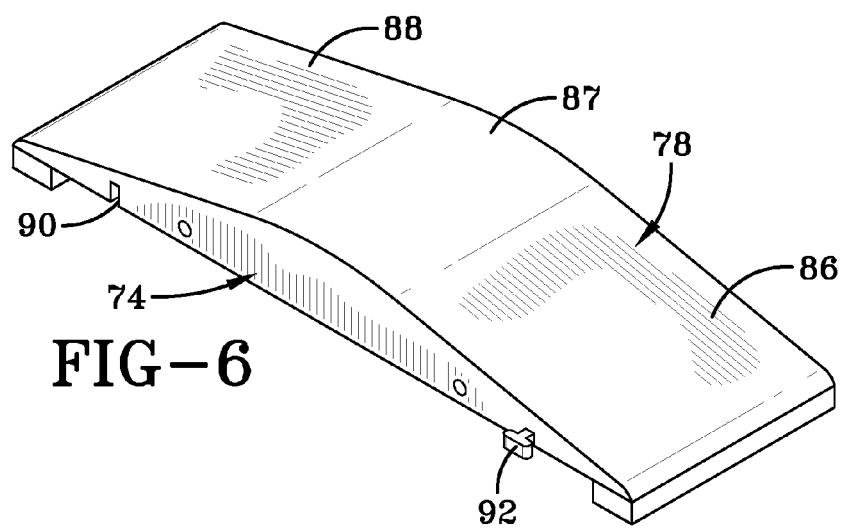
FIG. 6 is a top perspective view of a center unit of an alternative embodiment of an antenna assembly configured pursuant to the invention.
Figure 7:
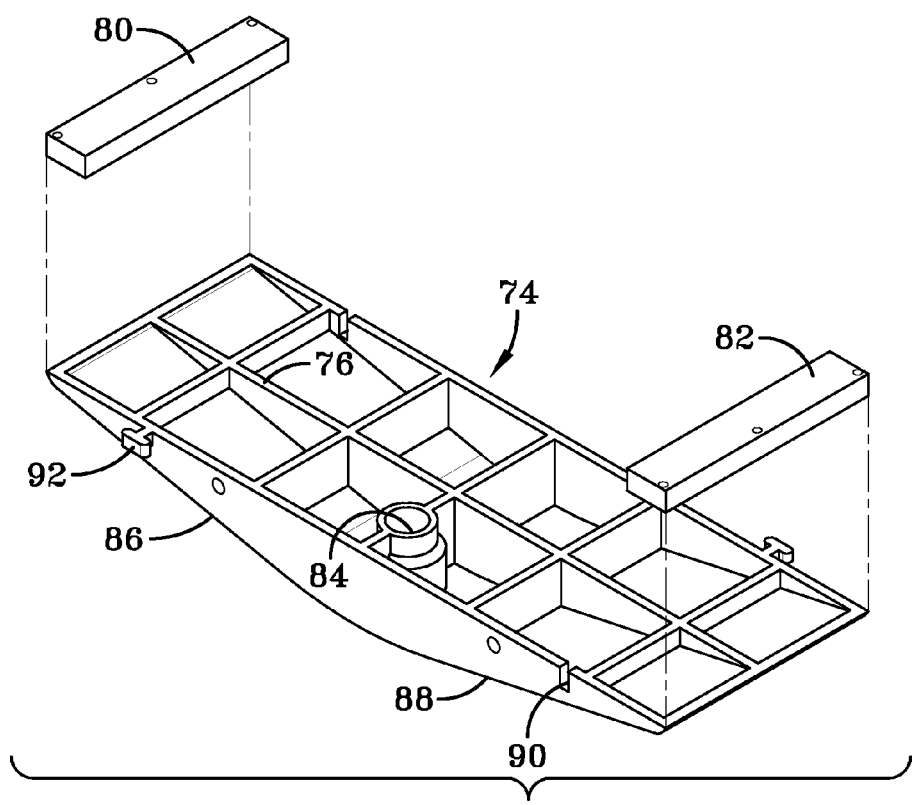
FIG. 7 is a partially exploded bottom perspective view of the center unit.
Figure 8:
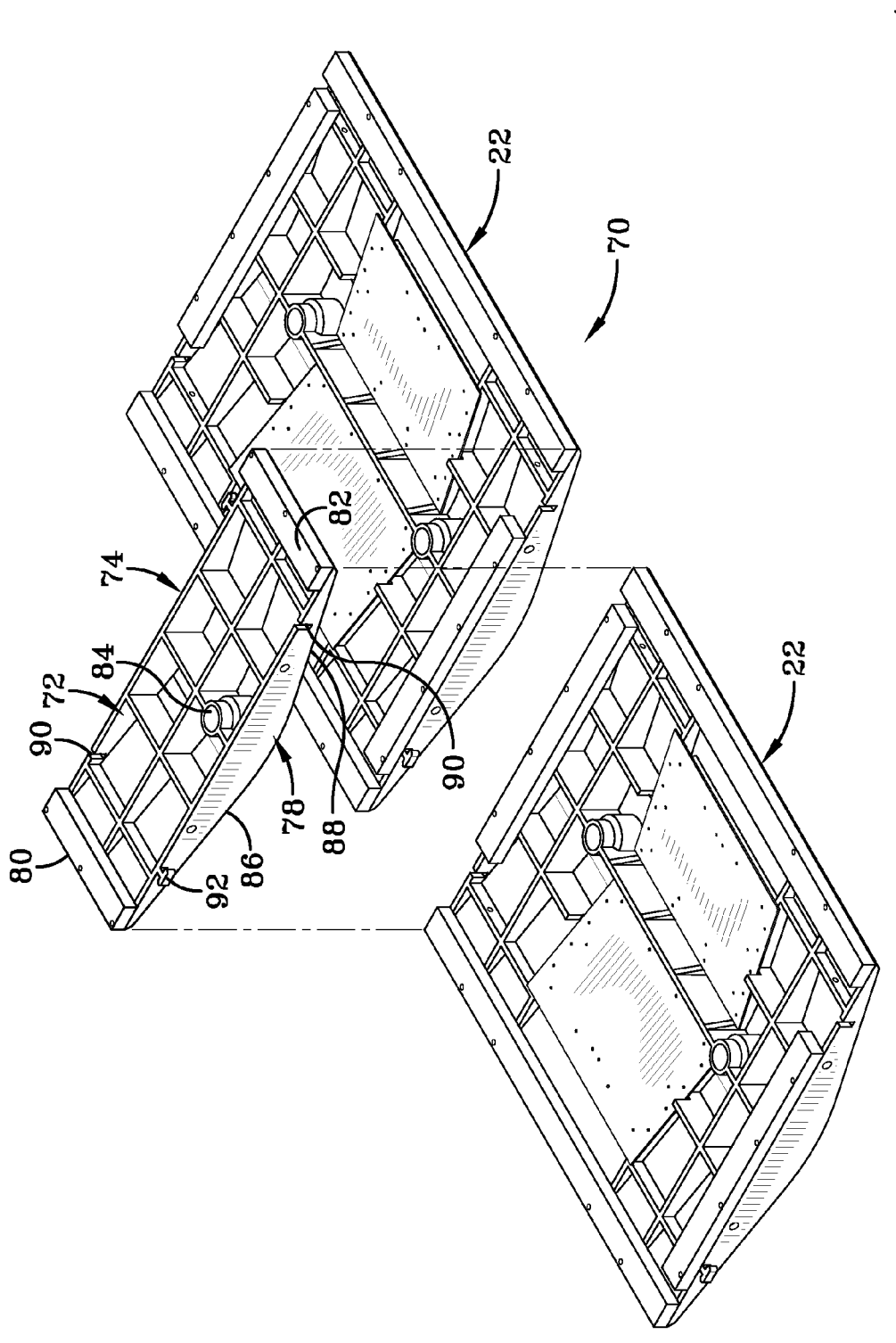
FIG. 8 is a bottom partially exploded view of the three unit alternative antenna assembly embodiment.

The tag 64 may be mounted to the inner liner of the sidewall of the tire 58 as explained. For such a mounting location, it may be beneficial to mount the antenna 50, 52 to a side of the tire 58 for improved coupling between the antenna beam pattern and the data transmission from the tag. To facilitate mounting the antenna to a side of a tire traveling over the stand, a bridging unit 72 may be utilized in a three-component stand assembly 70 such as that shown in FIGS. 6, 7, and 8. The tire is intended to ride directly over the bridging unit upper convex surface. The bridging unit 72 is situated between two antenna assemblies of the type described previously. The center or bridging unit 72 includes a body 74 having cross-rib reinforcement 76 and a convex upper surface 78. A pair of elongate support legs 80, 82 affix to an underside of the body 74 and support the body on a ground surface. A socket 84 connects the body 74 to the ground surface 14 in FIGS. 1A and 1B. The cover provides the arched or convex outer surface 78 and includes a forward inclined surface 86 and a rearward inclined surface 88, separated by an apex region 87. The forward and rearward surfaces 86, 88 have an acute tilt angle generally the same as the forward and rearward surfaces of the cover 30 (FIGS. 2 and 3) described previously. The bridging unit body 74 is formed to provide a latch finger 92 and a latch slot 90 along each longitudinal side that mate and interconnect with the latch 32 and latch slot 33 of the base 24. Accordingly, a three component series may be interconnected consisting of two antenna stands 22 on opposite side of a single bridging stand unit 72 as shown in FIG. 8. The center or bridging unit surfaces 86, 88 are targeted by a vehicle operator and tire 58 rides up and over the center unit during a drive-through read operation.

The incline of the surfaces 86, 88 complement the incline of surfaces 34, 38 of the antenna assembly 22. In the three component version of the invention, the two antenna assemblies 22 on opposite sides of the center unit 72 are to the side of the tire 58 and function to ensure that a complete and accurate data transmission between the tag 64 and the antenna 50, 52 will occur. The tilt of the antenna 50, 52 within each of the antenna assemblies 22 on opposite sides of the center unit 72 is generally the same, and it is preferred that the tilt angle be generally 13-15 degrees although more or less tilt may be employed if desired.

With reference to FIGS. 4A and 4B, the tag 64 rotates with the tire 58. It is desirable to slow the vehicle by means of the speed bump formed one or two antenna stand assemblies 22 and, if desired, bridging unit 72. A single antenna stand assembly may be employed if it is preferred that the tire ride directly over the convex surface of RFID transparent cover 30. If an adjacent position of the antenna 50 and/or 52 is desired, stand assembly 22 may be used with a bridging unit 72. The tire rides over the bridging unit 72 in such a configuration with the antenna members 50, 52 positioned to the side. It is preferable that the speed bump configuration slow the rotational rate of the vehicle tire 58 to a targeted reduced rotational read rate optimal for effecting reliable data transmission as the tire passes over the convex upper surface. The size, shape and height of the bump will be selected to induce the vehicle operator to lower the speed of the vehicle to achieve the targeted reduced rotational read rate speed. The span and degree of incline created by surfaces 34, 36, 38 or, surface 86, 87, and 88 if a bridging unit 72 is employed, is constructed to operatively require the tire and the transmitting device 64 to at least complete one revolution over a stand and/or multiple antenna component assemblies 70 as shown in FIGS. 5 and 9 at the targeted reduced rotational read rate speed as the tire traverses over the bump. The fields 66, 68 are established above the tire path across the path in such a manner so as to continuously maintain the tag within one or the other or both of the fields 66, 68 as the tire rotates at the reduced read rate speed across the bump. In so doing, data transmission between the tag and the antenna fields is continuous and highly reliable and accurate transmission of data is facilitated.

FIGS. 5 and 9 illustrate the deployment of a three-component antenna assembly system into a read station for a passenger car (FIG. 5) station and for a cargo truck drive-through station (FIG. 9). In FIG. 5, four three-component assemblies 70 are positioned to intercept the four tires on a passenger car and form a drive-through read station. The car is driven through the station and the vehicle tires encounter the four stand assemblies generally simultaneously. The driver steers the tires toward and over the center unit 72 of each three-component stand and, upon encountering the four "bumps", slows the vehicle to an optimal read speed. As the tires travel over the center units 72, respectively, the two antenna assembly units 22 on opposite sides of each center unit engage the tag on each tire and data transmission from the tag to the antenna within each unit 22 is established and completed. At the reduced vehicle speed caused by the speed bumps, the optimal time interval required to effect complete data transmission is achieved. Data downloaded to the antenna may then be conducted by wiring 100 to a transmitting device 102 for wireless data transmission to a processing computer 104.

In FIG. 9, four three-component assemblies 70 are positioned to intercept the tires on a cargo truck and form a drive-through read station. The truck 94 may have a pair of forward tires and dual tandem tires in the rear as shown. The truck 94 is driven through the station and the vehicle tires encounter the four stand assemblies 70 generally simultaneously. The driver steers the tires toward and over the center unit 72 of each three-component stand 70 and, upon encountering the four "bumps", slows the vehicle to an optimal reduced read speed. As the tires travel over the center units 72, respectively, the two antenna assembly units 22 on opposite sides of each center unit engage the tag of each tire and data transmission from the tag to the antenna within each unit 22 is established and completed. At the reduced vehicle speed caused by the speed bumps, the optimal time interval required to effect complete data transmission is achieved. The tandem tires in the rear of the truck 94 may be read simultaneously as the tires pass over the center bridging unit 72 by the two assemblies 22 positioned to the side of the unit 72. Data downloaded to the antenna may then be conducted by wiring 100 to a transmitting device 102 for wireless data transmission to a processing computer 104.

With reference to FIGS. 4A and 4B and 9, as described previously, the bumps created by the assemblies 70 are configured to slow the vehicle to a lower speed that will allow the tags 64 in FIGS. 4A and 4B and tags 18 and 20 in FIG. 9 to rotate at least one complete revolution as the tire carrying the tag passes over a stand and/or multiple antenna component assemblies 70 as shown in FIGS. 5 and 9 through the fields created by antenna 50, 52. The fields created by antenna 50, 52 are positioned to keep read contact with the tag throughout its revolution over the speed bump to insure a reliable and accurate data transmission. The tilt of the antenna 50 orients its field pattern toward the tire as the tire engages and rides up onto the assembly 70 and the tilt of antenna 52 orients its field pattern toward the tire as the tire travels down a rearward surface portion of the assembly 70 and exits.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An antenna assembly for receiving a data transmission from an electronic transmitting device mounted to a vehicle, the vehicle having at least one tire assembly including a tire, the antenna assembly comprising:
    a stand having a convex upper surface operative to intercept and engage the vehicle tire as the vehicle tire passes over the stand, whereby slowing the rotational rate of the vehicle tire to a targeted reduced rotational read rate as the tire passes over the convex upper surface;
    at least one antenna proximally mounted with respect to the stand, the one antenna having a directionally aimed one antenna field operatively directed toward an approach path of the vehicle tire that is oriented in linearly alignment to and intersecting the convex upper surface of the stand, the one antenna field operative to receive data transmission from the electronic transmitting device as the vehicle tire engages the stand upper surface along the linear approach path and further to receive the data transmission from the electronic transmitting device as the vehicle tire passes over the stand upper surface along an arcuate path at the reduced rotational read rate.

2. The antenna assembly of claim 1, wherein the directionally aimed one antenna field is tilted at an acute tilt angle toward an approach path of the vehicle tire onto the stand upper surface.

3. The antenna assembly of claim 2, wherein the acute tilt angle of the directionally aimed one antenna field is substantially within a range of 13 to 15 degrees to a horizontal ground plane.

4. The antenna assembly of claim 2, wherein the upper surface of the stand includes a leading tire-engaging inclined surface portion tilted at an acute tilt angle with respect to a horizontal ground plane.

5. The antenna assembly of claim 1, wherein the convex surface and the one antenna are attached to a common stand base member.

6. The antenna assembly of claim 5, wherein the one antenna is mounted to and housed within the stand base member with the one antenna housed at the tilt angle within the stand assembly and below the convex surface.

7. The antenna assembly of claim 1, wherein the one antenna is positioned adjacent to the convex upper surface affixed to a stand base member.

8. The antenna assembly of claim 1, wherein the transmitting device is mounted to the vehicle tire assembly and rotates with the tire, and wherein the stand upper convex surface has a leading end to a trailing end surface span sufficient to operatively require the tire and the transmitting device to substantially complete at least one revolution at the targeted reduced rotational read rate as the tire passes over the upper convex surface span.

9. The antenna assembly of claim 1, wherein further comprising at least a second antenna proximally mounted with respect to the stand, the second antenna having a directionally aimed second antenna field operatively directing a second antenna field toward a linear exit path of the vehicle tire from the upper surface of the stand to receive data transmission from the electronic transmitting device as the vehicle tire leaves the stand upper surface along the linear exit path at the reduced rotation read rate and further to receive the data transmission from the electronic transmitting device as the vehicle tire passes along a trailing portion of the arcuate path over the stand upper surface at the reduced rotational read rate.

10. The antenna assembly of claim 9, wherein the one directionally aimed antenna field is tilted at an acute tilt angle toward the approach path of the vehicle tire onto the stand upper surface and the second directionally aimed antenna field is tilted at an acute tilt angle toward the exit path of the vehicle tire along the trailing portion of the arcuate path over stand upper surface.

11. The antenna assembly of claim 10, wherein the one antenna field and the second antenna field acute tilt angles are substantially within a range of 13 to 15 degrees to a horizontal ground plane.

12. The antenna assembly of claim 9, wherein the first antenna field and the second antenna field are operatively positioned to place the transmitting device into a continuously coupled relationship with at least one of the first and second antenna fields as the vehicle tire approaches the stand along the approach path, passes across the convex upper surface, and leaves the stand along the exit path.

13. The antenna assembly of claim 12, wherein the transmitting device is mounted to the vehicle tire assembly and rotates with the tire, and wherein the stand upper convex surface has a leading end to a trailing end convex surface span sufficient to operatively require the tire and the transmitting device to substantially complete at least one revolution at the targeted reduced rotational read rate as the tire passes over the upper convex surface span.

14. The antenna assembly of claim 1, wherein the one antenna field substantially faces in a common direction with a leading portion of the convex upper surface of the stand.

15. The antenna assembly of claim 14, wherein the one antenna field and the leading portion of the convex upper surface of the stand face toward an approach path of the vehicle tire onto the stand convex upper surface.

16. The antenna assembly of claim 15, wherein the antenna is positioned adjacent to the stand convex upper surface affixed to a stand base member.

17. The antenna assembly of claim 16, wherein the one antenna mounts to the stand base member below a lateral convex surface closely adjacent to the stand upper convex surface.

18. The antenna assembly of claim 17, wherein the lateral convex surface has a complementary concavity with the stand upper convex surface.

19. The antenna assembly of claim 15, wherein the transmitting device is mounted to the vehicle tire assembly and rotates with the tire, and wherein the stand upper convex surface has a leading end to a trailing end surface span sufficient to operatively require the tire and the transmitting device to substantially complete at least one revolution at the targeted reduced rotational read rate as the tire passes over the upper convex surface span.

20. The antenna assembly of claim 19, wherein further comprising at least a second antenna proximally mounted with respect to the stand, the second antenna having a directionally aimed second antenna field operative to receive data transmission from the electronic transmitting device as the vehicle tire passes over a trailing portion of the stand upper surface at the reduced rotational read rate and further as the vehicle tire leaves the stand along an exit path.

\* \* \* \* \*